United States Patent
Hereford et al.

(10) Patent No.: US 12,489,864 B2
(45) Date of Patent: Dec. 2, 2025

(54) SYSTEMS AND METHODS FOR ROUTING MULTIMEDIA SIGNALS

(71) Applicant: Stryker Corporation, Kalamazoo, MI (US)

(72) Inventors: Eric Alexander Hereford, North Richland Hills, TX (US); Kyle Jason Simons, McKinney, TX (US); Antti Heikki Lounavaara, Coppell, TX (US)

(73) Assignee: Stryker Corporation, Portage, MI (US)

( * ) Notice: Subject to any disclaimer, the term of this patent is extended or adjusted under 35 U.S.C. 154(b) by 140 days.

(21) Appl. No.: 18/356,103

(22) Filed: Jul. 20, 2023

(65) Prior Publication Data

US 2024/0031536 A1   Jan. 25, 2024

Related U.S. Application Data

(60) Provisional application No. 63/369,037, filed on Jul. 21, 2022.

(51) Int. Cl.
*H04N 5/70* (2006.01)
*A61B 1/00* (2006.01)
(Continued)

(52) U.S. Cl.
CPC ........... *H04N 5/77* (2013.01); *A61B 1/00006* (2013.01); *A61B 1/00016* (2013.01);
(Continued)

(58) Field of Classification Search
None
See application file for complete search history.

(56) References Cited

U.S. PATENT DOCUMENTS

| 7,027,042 B2 * | 4/2006 | Heo ....................... G09G 5/006 345/212 |
| 9,083,989 B2 | 7/2015 | Eguchi |

(Continued)

FOREIGN PATENT DOCUMENTS

| EP | 3125566 A1 | 2/2017 |
| WO | 2017/154227 A1 | 9/2017 |

OTHER PUBLICATIONS

'General Troubleshooting Help' from Sling TV archive May 2022. (Year: 2022).*

(Continued)

*Primary Examiner* — Steven G Snyder
(74) *Attorney, Agent, or Firm* — Morrison & Foerster LLP

(57) ABSTRACT

Disclosed herein are systems and methods for reliably establishing a multimedia link to route one or more multimedia signals, such as high-definition and/or ultra-high-definition multimedia signals. In some instances, the user may turn on, plug in, or switch the source device that outputs multimedia signals, but the multimedia link may not be established properly due to a lock or hang up during power on and/or a coupling event. If the multimedia link has not been established continuously for a certain time period, then component(s) located along the multimedia link may be reset. In some instances, component(s) located along the multimedia link may lock or hang up if the properties of the multimedia signal do not align with configuration setting(s). The configuration setting(s) stored in configuration register(s) of the sink device may be written to one or more times to remove the lock or hang up.

21 Claims, 7 Drawing Sheets

(51) Int. Cl.
 *G06F 1/32* (2019.01)
 *G06F 1/3203* (2019.01)
 *G06F 1/3206* (2019.01)
 *G06F 1/3234* (2019.01)
 *G09G 5/00* (2006.01)
 *H04L 41/08* (2022.01)
 *H04L 41/0816* (2022.01)
 *H04L 43/16* (2022.01)
 *H04N 5/77* (2006.01)
 *H04N 7/18* (2006.01)
 *H04N 21/41* (2011.01)
 *H04N 21/4363* (2011.01)
 *H04N 21/44* (2011.01)
 *H04N 21/4425* (2011.01)
 *H04N 21/443* (2011.01)
 *H04N 21/647* (2011.01)

(52) U.S. Cl.
 CPC .......... *G06F 1/3203* (2013.01); *G06F 1/3206* (2013.01); *G06F 1/3234* (2013.01); *G09G 5/006* (2013.01); *H04L 41/0816* (2013.01); *H04L 43/16* (2013.01); *H04N 7/181* (2013.01); *H04N 21/4108* (2013.01); *H04N 21/43635* (2013.01); *H04N 21/4425* (2013.01); *H04N 21/4436* (2013.01); *H04N 21/6473* (2013.01); *G09G 2330/026* (2013.01); *G09G 2330/12* (2013.01); *G09G 2370/04* (2013.01); *G09G 2370/042* (2013.01); *G09G 2370/10* (2013.01); *G09G 2370/12* (2013.01); *G09G 2370/20* (2013.01); *G09G 2370/22* (2013.01); *G09G 2380/08* (2013.01)

(56) References Cited

U.S. PATENT DOCUMENTS

| | | | | |
|---|---|---|---|---|
| 9,565,419 | B2* | 2/2017 | Presler | H04N 13/275 |
| 10,110,943 | B2* | 10/2018 | Garner | H04N 21/4222 |
| 10,511,825 | B2* | 12/2019 | Presler | H04N 13/189 |
| 11,196,978 | B2* | 12/2021 | Presler | H04N 5/772 |
| 11,350,158 | B2 | 5/2022 | Shin | |
| 12,108,018 | B2* | 10/2024 | Presler | H04N 23/95 |
| 2003/0146884 | A1* | 8/2003 | Heo | G09G 5/006 345/30 |
| 2009/0022176 | A1* | 1/2009 | Nguyen | G09G 5/006 370/466 |
| 2010/0111489 | A1* | 5/2010 | Presler | H04N 23/695 348/222.1 |
| 2017/0006336 | A1* | 1/2017 | Lee | H04N 21/434 |
| 2017/0188013 | A1* | 6/2017 | Presler | H04N 13/239 |
| 2018/0035155 | A1* | 2/2018 | Garner | H04N 21/41265 |
| 2018/0189080 | A1 | 7/2018 | Standley | |
| 2020/0089464 | A1* | 3/2020 | Curtis | G10L 15/22 |
| 2020/0120327 | A1* | 4/2020 | Presler | H04N 13/194 |
| 2020/0184640 | A1 | 6/2020 | Mahadik et al. | |
| 2021/0153719 | A1 | 5/2021 | Kobayashi | |
| 2021/0196406 | A1 | 7/2021 | Mahadik et al. | |
| 2021/0203876 | A1 | 7/2021 | You | |
| 2021/0218591 | A1 | 7/2021 | Prabhu | |
| 2022/0021748 | A1 | 1/2022 | Hunter et al. | |
| 2022/0109818 | A1* | 4/2022 | Presler | H04N 13/275 |
| 2023/0370689 | A1* | 11/2023 | Nangeroni | H04N 21/4532 |
| 2025/0016297 | A1* | 1/2025 | Presler | H04N 13/161 |

OTHER PUBLICATIONS

'DSA8300 Digital Serial Analyzer and 80A00, 80C00, 80E00, 82A00 Sampling Modules 80N01, 80X00 Electrical Sampling Module Extender Cables Declassification and Security Instructions' document No. 077-1576-04 by Tektronix, 2018. (Year: 2018).*

'High-Definition Multimedia Interface Specification Version 1.3a' Nov. 10, 2006, pp. 1-2 (full document can be found at https://ez.analog.com/cfs-file/_key/telligent-evolution-components-attachments/00-317-00-00-00-05-21-37/HDMISpecification13a.pdf) (Year: 2006).*

'Digital Multifunctional System MX-B427W—User's Guide' by Sharp, Sep. 2020, pp. 1-5, 129, 152, 158, 161, 163, 169, 175, 178. (Year: 2020).*

Frigidaire 'Service Data Sheet Electric Ranges with 3XX Electronic Oven Controls' 2017. (Year: 2017).*

Machine Translation of Korean Patent Application KR 20080042474 A, published 2008. (Year: 2008).*

Machine Translation of Korean Patent Application KR 101957672 B1, published 2019. (Year: 2019).*

Machine Translation of Chinese Patent Applications CN 116916100 A, published 2023. (Year: 2023).*

Machine Translation of Chinese Patent Applications CN 116847157 A, published 2023. (Year: 2023).*

Extended European Search Report mailed Dec. 13, 2023, directed to EP Application No. 23186776.3; 10 pages.

Stryker. (Apr. 2020) "Connected OR Hub," located at https://www.stryker.com/us/en/endoscopy/products/connected-or-hub0.html, (2 pages).

* cited by examiner

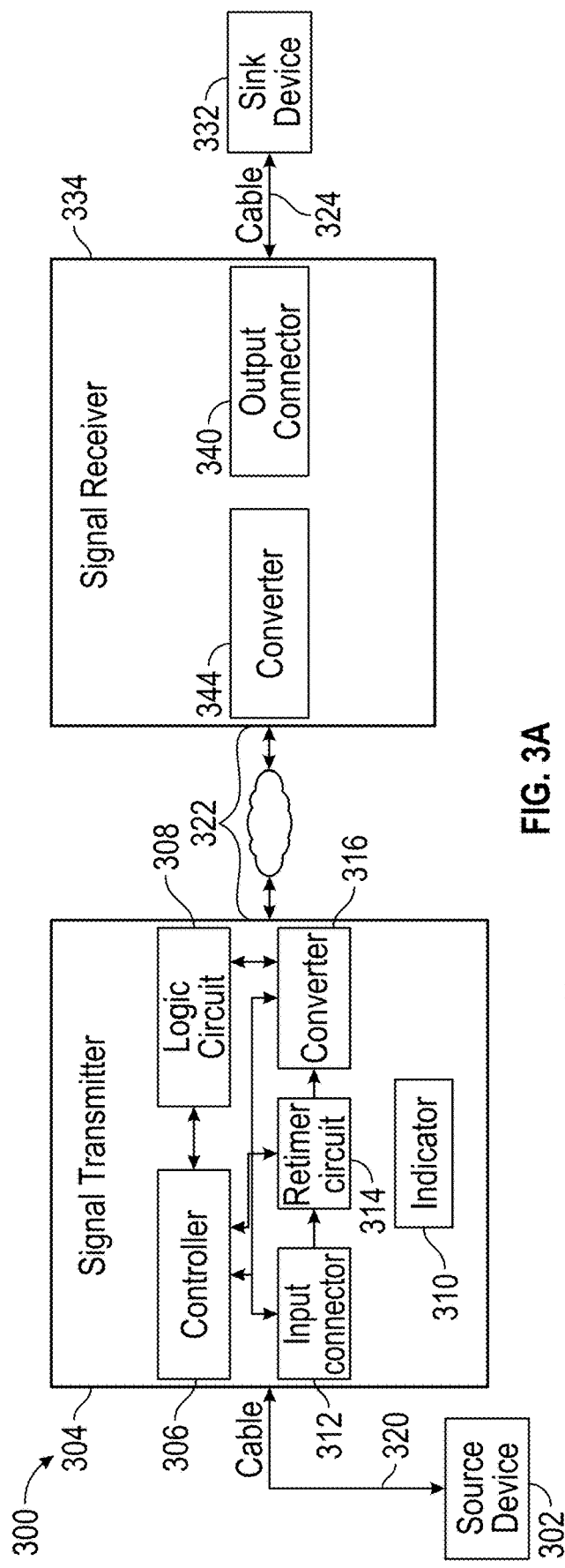
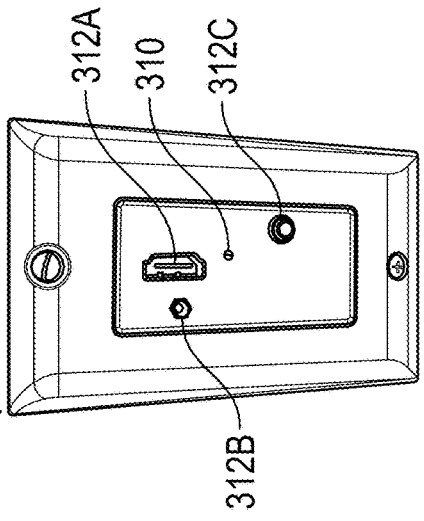
FIG. 3A
FIG. 3B

SYSTEMS AND METHODS FOR ROUTING MULTIMEDIA SIGNALS

CROSS-REFERENCE TO RELATED APPLICATIONS

This application claims the benefit of U.S. Provisional Application 63/369,037, filed Jul. 21, 2022, the entire contents of which are hereby incorporated by reference herein.

FIELD

The present invention relates to multimedia signals, and in particular, to reliably routing multimedia signals.

BACKGROUND

Surgery generally involves the use of one or more multimedia source devices, such as a high-definition (HD) camera coupled to an endoscope inserted into a subject to provide a surgeon with a clear and precise view within the subject's body. In some instances, the multimedia signal output from the camera is transmitted to and projected on a display device so that the surgeon can visualize the internal area of the body that is being viewed by the camera. The reliability of the multimedia signal when it is rendered on the display device can be critical to ensuring that the surgeon can visualize the internal area of the body with enough accuracy to safely perform a given medical procedure.

In some instances, the surgeon may utilize multiple multimedia source devices, as different multimedia source devices may offer different types of imaging. For example, an endoscopic camera may be used to visualize the internal area of the body, and a fluorescent camera may be used for open surgery type tasks. The multimedia source devices may capture one or more signals comprising audio, images, and/or video at high resolutions or ultra-high resolutions. One example of ultra-high resolution is 4K video, which has become an industry standard and can provide the surgeon with crystal clear imaging.

Once a surgery or procedure has begun, a surgeon may need to view multiple sources of information (e.g., audio, images, video) from multiple multimedia source devices. The surgeon or a medical professional may need to be able to reliably power on (before the surgery or procedure has begun) or couple (including routing before or during the surgery or procedure) a multimedia source device as a source of information. Additionally or alternatively, the surgeon may need to be able to reliably switch the multimedia signal displayed on a multimedia sink device, such as a primary surgical display, between various imaging feeds. Moreover, the imaging provided by the multimedia source device must be continuously available throughout the procedure. Any interruption to the multimedia signal caused by communication issues (such as a failed multimedia link) can jeopardize the safety of the patient and make completing the procedure a nearly impossible task. Even absent total failure, any degradation to video can create an unsafe situation because the surgeon may be required to perform the procedure without being able to clearly visualize the patient, which can increase the chances that a mistake is made during the medical procedure. Locks and hang ups in the systems and components used for routing multimedia signals from one or more source devices to one or more sink devices must be prevented or reduced. Continuous quality signal (e.g., audio, video) throughout the procedure must be ensured so that the safety of the medical procedure is not compromised.

SUMMARY

According to various aspects, systems and methods include preventing or removing locks or hang ups associated with a multimedia link. The multimedia link may be established by powering on or coupling a multimedia source device and/or switching between routing different multimedia signals (e.g., an HD signal and a UHD multimedia signal). A signal transmitter can automatically monitor the functionality status of a multimedia link. If the multimedia link has not been established (e.g., as determined, using the signal transmitter, by the multimedia signal not being a reliable multimedia link signal (not meeting one or more criteria)) continuously for a certain time period (during or after an acquisition time period), then a logic circuit included in the signal transmitter may be reset. In some aspects, resetting the logic circuit may comprise turning it off for an off-time period until its configuration settings are cleared and then turning it on. Resetting the logic circuit may cause the multimedia source device to disable and re-enable the multimedia signal. In some aspects, a controller in an image and video capture device may perform single or multiple writes to toggle the configuration settings stored in a configuration register. Resetting the logic circuit and/or toggling the configuration register may prevent or remove locks or hang ups.

According to some examples, a method of establishing a multimedia link between a source device and a sink device comprises: receiving, using a signal transceiver, an input multimedia signal from the source device, wherein the signal transceiver comprises a logic circuit and a controller; determining, using the signal transceiver, whether the input multimedia signal meets one or more criteria during or after an acquisition time period; and in accordance with the input multimedia signal not meeting the one or more criteria: turning off the logic circuit of the signal transceiver for an off-time period; and turning on the logic circuit after the off-time period.

In any of the examples, the off-time period is the time required to clear configuration settings of the logic circuit.

In any of the examples, the one or more criteria comprise one or more data values in the input multimedia signal or a signal from the logic circuit to the controller of the signal transceiver meeting one or more thresholds.

In any of the examples, the one or more criteria comprise one or more configuration settings of one or more converters of the signal transceiver or a signal receiver meeting one or more thresholds.

In any of the examples, the turning off the logic circuit and the turning on the logic circuit cause a hot plug signal to be reasserted, wherein the hot plug signal being asserted or reasserted indicates that the signal transceiver is ready to receive the input multimedia signal.

In any of the examples, the turning off the logic circuit and the turning on the logic circuit cause the source device to disable and re-enable the input multimedia signal.

In any of the examples, the turning off the logic circuit comprises sending a power-off signal from the controller to the logic circuit, and wherein the turning on the logic circuit comprises sending a power-on signal from the controller to the logic circuit.

In any of the examples, the turning off the logic circuit comprises sending a power-off signal from the controller to a power circuit that powers the logic circuit, and the turning on the logic circuit comprises sending a power-on signal from the controller to the power circuit.

In any of the examples, the method further comprises: repeating the determining step, the turning off step, and the turning on step for a number of failed consecutive iterations or a failed time duration where the input multimedia signal does not meet the one or more criteria; and ending the method when the number of failed consecutive iterations or the failed time duration is greater than a predetermined number.

In any of the examples, the method further comprises: providing a visual indication on the signal transceiver of a status of the signal transceiver.

In any of the examples, the method further comprises: converting, using an electrical-to-optical converter of the signal transceiver, the input multimedia signal to an optical signal.

In any of the examples, the input multimedia signal is converted using coarse wave division multiplexing.

In any of the examples, the method further comprises: transmitting, using the signal transceiver, the optical signal to a signal receiver using a fiber optic cable.

In any of the examples, the optical signal is transmitted over a single fiber.

In any of the examples, the method further comprises: converting, using an optical-to-electrical converter of a signal receiver, the optical signal to an electrical signal; and outputting, using the signal receiver, the electrical signal as an output multimedia signal to the sink device.

In any of the examples, the method further comprises: causing, using the controller, the sink device to record the input multimedia signal when a capture and record signal is transmitted.

In any of the examples, the acquisition time period is less than 60 seconds.

In any of the examples, the method further comprises: performing, using an image and video capture device, one or more of: a transition minimized differential signaling (TMDS) configuration algorithm, a scrambler status algorithm, or a multimedia signal format switching algorithm.

According to some examples, a system comprises: a signal transceiver comprising: one or more input connectors, wherein at least one input connector is configured to receive an input multimedia signal from a source device; a logic circuit; and a controller that: determines whether the input multimedia signal meets one or more criteria during or after an acquisition time period; and in accordance with the input multimedia signal not meeting the one or more criteria: turns off the logic circuit for an off-time period; and turns on the logic circuit after the off-time period.

In any of the examples, the off-time period is the time required to clear configuration settings of the logic circuit.

In any of the examples, the one or more criteria comprise one or more data values in the input multimedia signal or a signal from the logic circuit to the controller meeting one or more thresholds.

In any of the examples, the one or more criteria comprise one or more configuration settings of one or more converters of the signal transceiver or a signal receiver meeting one or more thresholds.

In any of the examples, the logic circuit causes a hot plug signal to be reasserted, wherein the hot plug signal being asserted or reasserted indicates that the signal transceiver is ready to receive the input multimedia signal.

In any of the examples, the hot plug signal being asserted or reasserted causes the source device to disable and re-enable the input multimedia signal.

In any of the examples, the controller sends a power-off signal to the logic circuit to turn off the logic circuit, and wherein the controller sends a power-on signal to the logic circuit to turn on the logic circuit.

In any of the examples, the controller sends a power-off signal to a power circuit that powers the logic circuit to turn off the logic circuit, and wherein the controller sends a power-on signal to the power circuit to turn on the logic circuit.

In any of the examples, the controller further: repeats the determine step, the turning off step, and the turning on step for a number of failed consecutive iterations or a failed time duration where the input multimedia signal does not meet the one or more criteria; and ends when the number of failed consecutive iterations or the failed time duration is greater than a predetermined number.

In any of the examples, the signal transceiver is a wall plate.

In any of the examples, the wall plate comprises a grounding screw.

In any of the examples, the system further comprises: a power circuit for powering the signal transceiver, wherein the power circuit has a 10-25V range.

In any of the examples, the system further comprises: an indicator that provides a visual indication of a status of the signal transceiver.

In any of the examples, the at least one input connector is a high-definition multimedia interface (HDMI) connector.

In any of the examples, the one or more input connectors comprise a cable retention connector.

In any of the examples, the one or more input connectors comprise a capture and record connector.

In any of the examples, the signal transceiver further comprises a retimer circuit that retimes the input multimedia signal, refreshes the input multimedia signal, or both.

In any of the examples, the signal transceiver further comprises an electrical-to-optical converter that converts the input multimedia signal to an optical signal.

In any of the examples, the input multimedia signal is converted using coarse wave division multiplexing.

In any of the examples, the optical signal is transmitted over a single fiber.

In any of the examples, the optical signal is a multimedia signal output by the signal transceiver.

In any of the examples, the signal transceiver is coupled to a signal receiver using a fiber optic cable.

In any of the examples, the system further comprises: a signal receiver comprising: an optical-to-electrical converter that converts an optical signal to an output multimedia signal; and one or more output connectors, wherein at least one output connector is configured to output the output multimedia signal to a sink device.

In any of the examples, the acquisition time period is less than 60 seconds.

In any of the examples, the system further comprises: an image and video capture device that performs one or more of: a transition minimized differential signaling (TMDS) configuration algorithm, a scrambler status algorithm, or a multimedia signal format switching algorithm.

According to some examples, a method for establishing a multimedia link between a source device and a sink device comprises: determining, using a controller, whether an operation mode is enabled; in accordance with the operation mode being enabled, determining, using the controller, whether an input multimedia signal from the source device is a first format; in accordance with the input multimedia signal being the first format, determining, using the controller, whether a register of the operation mode is set to a first-format configuration; and setting, using the controller, a status and control data channel (SCDC) configuration register to the first-format configuration when the input multimedia signal is the first format and the register of the operation mode is not set to the first-format configuration.

In any of the examples, the first format is ultra-high-definition (UHD), the first-format configuration is a UHD configuration, the second format is high-definition (HD), and the second-format configuration is an HD configuration.

In any of the examples, the operation mode is a transition minimized differential signaling (TMDS) configuration operation mode, and the register of the operation mode is the SCDC configuration register.

In any of the examples, the operation mode is a scrambler status operation mode, and the register of the operation mode is a scrambler status register.

In any of the examples, the method further comprises: in accordance with the input multimedia signal not being the first format, determining, using the controller, whether the register of the operation mode is set to a second-format configuration; and setting, using the controller, the SCDC configuration register to the second-format configuration when the input multimedia signal is not the first format and the register of the operation mode is not set to the second-format configuration.

In any of the examples, the operation mode is a transition minimized differential signaling (TMDS) configuration operation mode, and the register of the operation mode is the SCDC configuration register.

In any of the examples, the operation mode is a scrambler status operation mode, and the register of the operation mode is a scrambler status register.

In any of the examples, the method further comprises: setting, using the controller, the SCDC configuration register to a second-format configuration; and setting, using the controller, the SCDC configuration register to the first-format configuration.

In any of the examples, the method further comprises: determining, using the controller, whether a toggle mode is enabled; wherein the setting the SCDC configuration register to the second-format configuration and the setting the SCDC configuration register to the first-format configuration are in accordance with the toggle mode being enabled.

In any of the examples, the determining whether the toggle mode is enabled is performed after the setting the SCDC configuration register to the first-format configuration.

In any of the examples, the determining whether the toggle mode is enabled is performed after setting the SCDC configuration register to the second-format configuration.

In any of the examples, the setting the SCDC configuration register to the second-format configuration and the setting the SCDC configuration register to the first-format configuration are performed after the setting the SCDC configuration register to the first-format configuration.

In any of the examples, the controller is included in an image and video capture device.

According to some examples, a system comprises: a source device configured to transmit an input multimedia signal; a sink device comprising a status and control data channel (SCDC) configuration register; and a controller that: determines whether an operation mode is enabled; in accordance with the operation mode being enabled, determines whether the input multimedia signal is a first format; and in accordance with the input multimedia signal being the first format, determines whether a register of the operation mode is set to a first-format configuration; wherein the source device is further configured to set the SCDC configuration register to the first-format configuration when the input multimedia signal is the first format and the register of the operation mode is not set to the first-format configuration.

In any of the examples, the first format is ultra-high-definition (UHD), the first-format configuration is a UHD configuration, the second format is high-definition (HD), and the second-format configuration is an HD configuration.

In any of the examples, the operation mode is a transition minimized differential signaling (TMDS) configuration operation mode, and the register of the operation mode is the SCDC configuration register.

In any of the examples, the operation mode is a scrambler status operation mode, and the register of the operation mode is a scrambler status register.

In any of the examples, the controller further determines whether the register of the operation mode is set to a second-format configuration in accordance with the input multimedia signal not being the first format; and wherein the source device further sets the SCDC configuration register to the second-format configuration when the input multimedia signal is not the first format and the register of the operation mode is not set to the second-format configuration.

In any of the examples, the operation mode is a transition minimized differential signaling (TMDS) configuration operation mode, and the register of the operation mode is the SCDC configuration register.

In any of the examples, the operation mode is a scrambler status operation mode, and the register of the operation mode is a scrambler status register.

In any of the examples, the controller further: sets the SCDC configuration register to a second-format configuration; and sets the SCDC configuration register to the first-format configuration.

In any of the examples, the controller further: determines whether a toggle mode is enabled; sets the SCDC configuration register to the second-format configuration and sets the SCDC configuration register to the first-format configuration in accordance with the toggle mode being enabled.

In any of the examples, the controller determines whether the toggle mode is enabled after the setting the SCDC configuration register to the first-format configuration.

In any of the examples, the controller determines whether the toggle mode is enabled after the setting the SCDC configuration register to the second-format configuration.

In any of the examples, the controller sets the SCDC configuration register to the second-format configuration and sets the SCDC configuration register to the first-format configuration after the setting the SCDC configuration register to the first-format configuration.

In any of the examples, the system further comprises: an image and video capture device, wherein the image and video capture device comprises the controller.

According to some examples, a method for switching a multimedia input signal format comprises: determining, using a controller, whether an input multimedia signal from a source device is a first format; and in accordance with the input multimedia signal being the first format: setting, using the controller, a status and control data channel (SCDC) configuration register to a first-format configuration; setting, using the controller, the SCDC configuration register to a second-format configuration; and setting, using the controller, the SCDC configuration register to the first-format configuration.

In any of the examples, the method further comprises: in accordance with the input multimedia signal not being the first format: setting, using the controller, the SCDC configuration register to the second-format configuration; setting, using the controller, the SCDC configuration register to the first-format configuration; and setting, using the controller, the SCDC configuration register to the second-format configuration.

In any of the examples, the controller is included in an image and video capture device.

In any of the examples, the first format is ultra-high-definition (UHD), the first-format configuration is a UHD configuration, the second format is high-definition (HD), and the second-format configuration is an HD configuration.

According to some examples, a system comprises: a source device configured to transmit an input multimedia signal; a sink device comprising a status and control data channel (SCDC) configuration register; and a controller that: determines whether the input multimedia signal switched from a second format to a first format; and in accordance with the input multimedia signal having switched from the second format to the first format: sets the SCDC configuration register to a first-format configuration; sets the SCDC configuration register to a second-format configuration; and sets the SCDC configuration register to the first-format configuration.

In any of the examples, the controller further: determines whether the input multimedia signal switched from the first format to the second format; and in accordance with the input multimedia signal having switched from the first format to the second format: sets the SCDC configuration register to the second-format configuration; sets the SCDC configuration register to the first-format configuration; and sets the SCDC configuration register to the second-format configuration.

In any of the examples, the system further comprises: an image and video capture device, wherein the image and video capture device comprises the controller.

In any of the examples, the first format is ultra-high-definition (UHD), the first-format configuration is a UHD configuration, the second format is high-definition (HD), and the second-format configuration is an HD configuration.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE FIGURES

The invention will now be described, by way of example only, with reference to the accompanying drawings, in which:

FIG. 3A illustrates a block diagram of an example multimedia routing system for establishing a multimedia link, according to some aspects.

FIG. 3B illustrates an example signal transmitter wall plate, according to some aspects.

DETAILED DESCRIPTION

Figure 1:
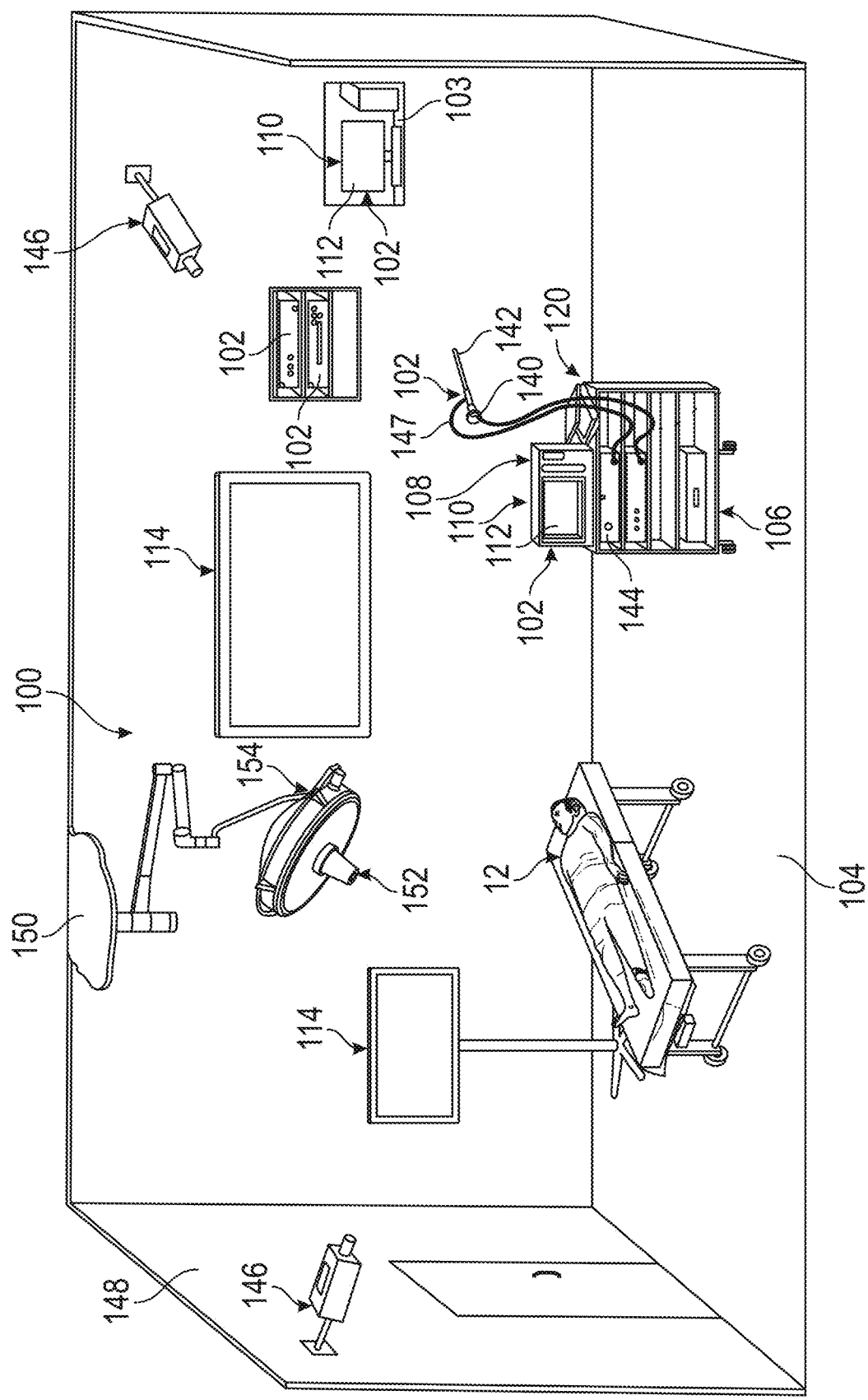
FIG. 1 illustrates an example operating room, according to some aspects.

Reference will now be made in detail to implementations and various aspects and variations of systems and methods described herein. Although several example variations of the systems and methods are described herein, other variations of the systems and methods may include aspects of the systems and methods described herein combined in any suitable manner having combinations of all or some of the aspects described.

Systems and methods according to the principles described herein can reliably establish a multimedia link to route one or more multimedia signals. The systems and methods can reliably route high-definition (HD) and/or ultra-high-definition (UHD) multimedia signals. For example, an image and video capture device can route an HD signal (e.g., from an endoscopic camera) and a UHD signal (e.g., from a 4K fluorescence imaging camera) to a device (e.g., a 4K display). In some instances, the user may turn on, plug in, or switch the source device that outputs multimedia signals, but the multimedia link may not be established properly due to a lock or hang up during power on and/or a coupling event. Examples of the disclosure may help prevent or reduce the lock or hang ups.

The systems and methods described herein can automatically and/or continuously monitor the functionality status of a multimedia link, including components located along the multimedia link between a source device and a sink device. If the multimedia link has not been established (e.g., as determined by the multimedia signal not meeting one or more criteria indicative of being a reliable multimedia link signal) continuously for a certain time period (during or after an acquisition time period), then one or more components located along the multimedia link may be reset. For example, a logic circuit located between a multimedia source device and a multimedia sink device may be turned off until its configuration settings are cleared and then turned on, thereby reconfiguring the configuration settings of the logic circuit. Turning the logic circuit off and then on may cause the source device to disable and re-enable the multimedia signal, improving the reliability of the multimedia signal and preventing or removing the lock or hang up during power on and/or a coupling event.

In some instances, multimedia signals may be routed based on user input from a user interface. For example, the user may switch between different input connectors, changing the input multimedia signal to be routed from a source device to a sink device. One or more components located along the multimedia link, such as an image and video capture device, may lock or hang up if the properties of the input multimedia signal (output from the source device) do not align with the configuration settings of the sink device. The configuration settings stored in one or more configuration registers of the sink device may be written to one or more times (e.g., toggled) to remove the lock or hang up.

The systems and methods for routing one or more multimedia signals, according to the principles described herein, can be used by a surgeon or medical professional during a surgical procedure. For example, the multimedia routing may allow the surgeon or medical professional to display and/or record multimedia signals from a multimedia source device, such as a fluorescence imaging camera that illuminates blood vessels and related target tissue of a subject during a surgical procedure. In some aspects, the surgeon or medical professional may use the multimedia signal routing to switch to a different multimedia source device, such as an endoscopic camera. Additionally or alternatively, the systems and methods for routing multimedia signals may be utilized for modifying the route of medical multimedia signals from a multimedia source device being displayed at one sink device (e.g., a first display) to an alternate sink device (e.g., a second display). Additionally or alternatively, the systems and methods for routing multimedia signals may be utilized for non-surgical applications, such as for diagnosis or in support of non-surgical treatments.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field-programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an example operating room, according to some aspects. The operating room 100 comprises at least one medical device 102 to assist in performing a medical or surgical procedure and/or for recording keeping purposes. For example, the medical device 102 may be used to input or receive (e.g., from electronic medical records (EMRs), from electronic health records, communicated in real-time from another system, etc.) patient information for use with information or images saved onto the medical device 102, displaying information or images from the medical device 102, sending to other medical devices 102, or a combination thereof. In some aspects, the medical device 102 may be used to record patient information, including storing the information or images in an EMR, EHR, or other type of file.

The medical device 102 located within the operating room 100 can include any device that is capable of saving information related to a subject 12. The medical device 102 may or may not be coupled to a network that includes records of the subject 12. The medical device 102 may include a computer system 110 (e.g., a desktop computer, a laptop computer, a tablet device, etc.) having an application server. The computer system 110 can have a motherboard that includes one or more processors or other similar control devices as well as one or more memory devices. The processor controls the overall operation of the computer system 110 and can include hardwired circuitry, programmable circuitry that executes software, or a combination thereof. The processor may, for example, execute software stored in the memory device. The processor may include, for example, one or more general- or special-purpose programmable microprocessors and/or microcontrollers, application specific integrated circuits (ASICs), programmable logic devices (PLDs), programmable gate arrays (PGAs), or the like. The memory device may include any combination of one or more random access memories (RAMs), read-only memories (ROMs) (which may be programmable), flash memory, and/or other similar storage devices. Patient information may be inputted into the computer system 110 for use with the computer system 110 (e.g., for making an operative note during the medical or surgical procedure on the subject 12 in the operating room 100) and/or the computer system 110 can transmit the patient information to another medical device 102 (via either a wired connection or wirelessly).

The medical device 102 can be positioned in the operating room 100 on a table (stationary or portable), a floor 104, a portable cart 106, an equipment boom, and/or shelving 103. FIG. 1 illustrates two computer systems 110: a first computer system 110 in the form of a desktop computer shelving 103 and a second computer system 110 incorporated into an image and video capture device 108 on a portable cart 106. It is contemplated that the computer system 110 can be on the portable cart 106 (e.g., on the same cart 106 as an image and video capture device 108 or on a separate cart). In some aspects, the image and video capture device 108 and/or associated router(s) (not shown) may be located in a room outside of the operating room, such as in a closet. In some other aspects, the image and video capture device 108 and/or associated router(s) (not shown) may be located in a cabinet inside the operating room. Further, examples of the disclosure may include any number of computer systems.

The image and video capture device 108 may be capable of recording images, recording videos, displaying images, displaying videos, recording audio, outputting audio, or a combination thereof. In some aspects, patient information can be input into the image and video capture device 108 for adding to the images and videos recorded and/or displayed by the image and video capture device 108. The image and video capture device 108 can include internal storage (e.g., a hard drive, a solid state drive, etc.) for storing the captured images and videos. The image and video capture device 108 can also display any captured or saved images (e.g., from the internal hard drive) or on an associated touchscreen monitor 112 and/or an additional monitor 114 coupled to the image and video capture device 108 via either a wired connection or wirelessly. It is contemplated that the image and video capture device 108 could obtain or create images of the subject 12 during a medical or surgical procedure from a variety of sources (e.g., from video cameras, video cassette recorders, X-ray scanners (which convert X-ray films to digital files), digital X-ray acquisition apparatus, fluoroscopes, computed tomography (CT) scanners, magnetic resonance imaging (MRI) scanners, ultrasound scanners, charge-coupled (CCD) devices, and other types of scanners (handheld or otherwise)). If coupled to a network, the image and video capture device 108 can also communicate with a picture archiving and communication system (PACS), as is well known to those skilled in the art, to save images and video in the PACS and for retrieving images and videos from the PACS. The image and video capture device 108 can couple and/or integrate with, e.g., an electronic medical records database and/or a media asset management database.

The image and video capture device 108 is capable of displaying images and videos on a touchscreen monitor 112 and/or on an additional monitor 114 captured live by cameras (e.g., a video camera 140 coupled to an associated endoscope 142, which communicates with a camera control unit 144 via a fiber optic cable 147, with the camera control unit 144 communicating via wires or wirelessly with the image and video capture device 108) and/or replayed from recorded images and videos. It is further contemplated that the image and video capture device 108 can display images and videos on the touchscreen monitor 112 and/or on the additional monitor 114 captured live by a room camera 146 fixed to walls 148 or a ceiling 150 of the operating room 100 (e.g., a room camera 146 as shown or a camera 152 in an overhead light 154). In some aspects, the image and video capture device 108 can be used to integrate, annotate, and/or correct images.

Figure 2:
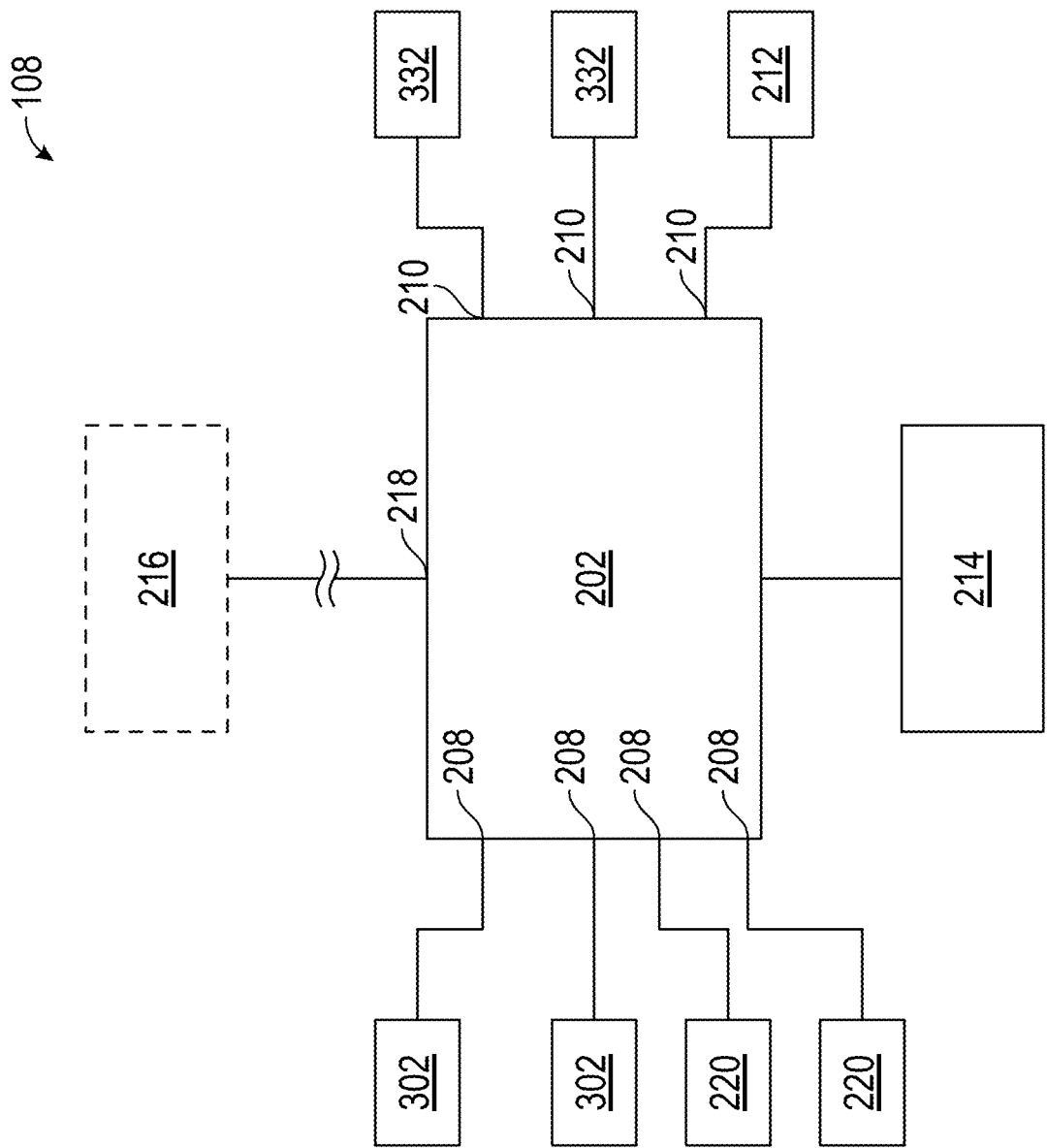
FIG. 2 illustrates an example image and video capture device, according to some aspects.

FIG. 2 illustrates a block diagram of an example image and video capture device 108, according to some aspects. The image and video capture device 108 may include a medical data processing hub 202 that receives one or more multimedia signals from one or more source devices 302 to be routed to one or more sink devices 332 (e.g., one or more displays). The one or more source devices 302 may generate image data associated with treatment of a patient (e.g., subject 12 shown in FIG. 1). The image data can be images or videos generated during treatment of the patient in support of one or more medical procedures, such as video captured by an endoscopic camera. Examples of source devices include, without limitation, endoscopic systems, open field imaging systems, x-ray systems such as intraoperative c-arm systems, computer tomography (CT) systems, ultrasound systems, magnetic resonance imaging (MRI) systems, and nuclear medicine systems.

In some aspects, hub 202 may receive data from one or more non-imaging devices 220 that may be used in connection with (e.g., during) a medical imaging session (e.g., surgical procedure) and may provide information that may be relevant for display during a medical imaging session. Non-limiting examples of non-imaging devices include insufflators, illumination controllers, and voice control systems.

The hub 202 may receive a multimedia signal from the one or more source devices 302 through one or more input ports 208. The hub 202 generates one or more display feeds using the received multimedia signal and transmits the one or more display feeds to one or more sink devices 332 via one or more output ports 210. For example, the hub 202 may generate a display feed that includes enhanced imaging of tissue of a patient based on imaging generated by one or more source devices 302, and the enhanced imaging may be displayed on one or more of the sink devices 332 (e.g., displays) to assist a practitioner during treatment of the patient. In some aspects, the hub 202 can operate with a router to route multimedia signals from the input port(s) 208 to the output port(s) 210. The format of the multimedia data may include analog, digital, HD format, UHD format (e.g., 4K or 8K video), or the like. In some aspects, the hub 202 may be configured to control a signal router or a network router that converts the multimedia signal to an IP multimedia stream (e.g., using encoders and decoders). In some aspects, the signal router may be capable of routing multimedia signals without use of a network router and does not require conversion to an IP multimedia stream. The hub 202, signal router, or both may operate with (e.g., integrated with or located externally) a circuit that switches between multimedia inputs for a given multimedia output.

Hub 202 may also transmit display feeds to one or more recording devices 212 for recording enhanced imaging for later retrieval. Input ports 208 and output ports 210 may be any suitable type of data transmission ports, such as digital visual interface (DVI) ports, high-definition multimedia interface (HDMI) ports, DisplayPort (DP) ports, VGA ports, RS232 ports, IP (network e.g. Ethernet) ports, and the like.

Hub 202 may be coupled to one or more networks 216 via one or more network connections 218. The one or more networks 216 may include a local network such as a hospital information system or a wider network such as a wide area network or the internet. A network connection 218 can be a wired connection, such as an Ethernet connection, or a wireless network connection, such as a Wi-Fi connection. In some aspects, the hub 202 may access the one or more networks 216 to retrieve configuration data stored at a network location for configuring the hub for an imaging session, and/or may access the one or more networks to receive updated software and/or updated hardware files for processing imaging data. In some aspects, the hub 202 may access a database comprising information, such as EMRs, EHRs, or other patient data, for retrieval and/or storage.

One or more user interfaces 214 may be in communication with (e.g., connected to) the hub 202 for a user to provide input to the hub 202. The user may input data related to configuring the hub 202 for an imaging session. User input can include, for example, selection of a practitioner profile associated with an upcoming imaging session, selection of the type of imaging session or types of procedure to be performed during an imaging session, selection of which inputs (e.g., multimedia inputs) are routed to which outputs (e.g., multimedia outputs), predetermined routing selections (e.g., surgeon- or patient-specific, preset configurations), or any other relevant information. The one or more user interfaces 214 may include a tablet, a keyboard, a mouse, a voice control system, a keypad, a touchscreen, or any combination thereof. In some aspects, the one or more user interfaces 214 may include one or more indicators, such as a signal input indicator (e.g., phase-locked loop (PLL) indicator) that indicates when an input port 208 comprises a multimedia signal.

As described in detail below, the hub 202 processes received medical imaging data and any other relevant data and generates enhanced display feeds for display on one or more displays 206 during an imaging session. According to some aspects, the hub 202 may combine multiple imaging sources into a single display feed, process received imaging data to generate richer imaging data, modify imaging data for better utilization of display space, and/or reconfigure the processing of imaging data depending on the needs and preferences of users from imaging session to imaging session.

Aspects of the disclosure include one or more components and one or more methods for reliably establishing a multimedia link to route one or more multimedia signals (e.g., HD- and UHD-format multimedia signals). FIG. 3A illustrates a block diagram of an example multimedia routing system 300 for establishing a multimedia link, according to some aspects. The multimedia signal may be output by a source device 302. The source device 302 may be any type of equipment that outputs a multimedia signal, such as an endoscopic camera located on a tower or cart, as one non-limiting example. The multimedia signal may be any type of signal including, but is not limited to, video, audio, textual data, controller data, human-machine interface data, etc. In some aspects, the multimedia signal may be in a first format (e.g., HDMI format) with, e.g., 4 k resolution at 60 Hz (60 frames per second) with 24 bits per pixel (bpp) color. The UHD format may comprise other resolutions, such as (but not limited to) 8 k, other frequencies, such as (but not limited to) 120 Hz, other bpp, such as (but not limited to) 30 bpp, or a combination thereof. The source device 302 may be coupled to a signal transmitter 304 using a cable 320. In some examples, the signal transmitter includes a signal transceiver operable to receive a multimedia signal (e.g., input multimedia signal). In some aspects, the signal transmitter 304 may receive an input multimedia signal from the source device 302 and facilitates routing the multimedia signal to a signal receiver 334 and/or a sink device 332. In some aspects, the signal transmitter 304 may be a wall plate capable of being attached to a structure or fixture of a room (e.g., to wall 148, ceiling 150, or floor 104 of FIG. 1). For example, the signal transmitter 304 may be a wall plate coupled to the source device 302 via a UHD-format cable 320 (e.g., an HDMI cable). In some aspects, the signal transmitter 304 may be coupled to the signal receiver 334 using a connection 322. In some aspects, the connection 322 may comprise a cable, such as a fiber optic cable, a copper cable, an active optical cable, or the like. In some aspects, the connection 322 may comprise a network link (as shown in FIG. 3A) using IP-based communications. For example, the signal transmitter 304 may transmit packetized IP video over a network link to the signal receiver 334 using a Software Defined Video-over-Ethernet (SDVoE) protocol.

The signal transmitter 304 may comprise a controller 306, a logic circuit 308, one or more indicators 310, one or more input connectors 312, a retimer circuit 314, a converter 316, or a combination thereof. The controller 306 may configure and control the signal transmitter 304. In some aspects, the controller 306 may be used to provide the status (e.g., errors, state, etc.) of the signal transmitter 304, the multimedia link, or a combination thereof. In some aspects, the controller 306 may be any type of circuit comprising control logic, such as a microcontroller or a state machine.

The logic circuit 308 may configure and control the signal receiver 334. In some aspects, the logic circuit 308 may be used to provide the status (e.g., errors, state, etc.) of the signal receiver 334 and/or the sink device 332. Additionally or alternatively, in some aspects, the logic circuit 308 may be configured to perform signal conversions or translations. As one non-limiting example, the logic circuit 308 may combine multiple multimedia signals (e.g., using any multiplex method, such as time-division multiplexing) into a single multimedia signal. In some aspects, the single multimedia signal may be converted into an optical signal by, e.g., converter 316.

In some aspects, the logic circuit 308 may include one or more general- or special-purpose programmable microprocessors and/or microcontrollers, application specific integrated circuits (ASICs), programmable logic devices (PLDs), programmable gate arrays (PGAs), or the like. The logic circuit 308 can be separate from or integrated as part of the controller 306. In some aspects, the logic circuit 308 may communicate with the controller 306 and/or converter 316. For example, the logic circuit 308 may transmit or receive one or more control signals to or from the controller 306. In some aspects, the logic circuit 308 may transmit or receive control information (e.g., high-speed control information) to or from the converter 316. Although the figure illustrates the signal transmitter 304 as routing a multimedia signal to a single signal receiver 334 and a single sink device 332, aspects of the disclosure may include the signal transmitter 304 routing to a plurality of signal receivers and/or a plurality of sink devices.

Further aspects of the disclosure may comprise the signal transmitter 304 including other components not shown in FIG. 3A. For example, in some instances, the multimedia routing system 300 may be configured for an IP implementation, where the signal transmitter 304 may comprise an IP encoder and the logic circuit 308 may perform packetization for the IP implementation.

The one or more indicators 310 may include one or more optical components for providing an indication. In some aspects, the one or more indicators may include a status light emitting diode (LED) that provides a visual indication of the status (e.g., power and/or functionality status) of the signal transmitter 304. In some aspects, the visual indication may be by way of illuminating a color, such as a certain color to indicate that the signal transmitter 304 has power, the logic circuit 308 is being reset, or the logic circuit 308 reset process has failed. In some aspects, the visual indication may be by way of an illumination pattern, such as a certain blinking sequence.

The one or more input connectors 312 may be used to receive one or more signals from an external component. In some aspects, the one or more input connectors 312 may be capable of passing a multimedia signal through without changing its properties. For example, as shown in FIG. 3B, a signal transmitter wall plate 301 may comprise at least one input connector 312A configured to receive an input multimedia signal from a source device. The input connector 312A may be a UHD-format connector (e.g., HDMI connector) configured to receive a UHD multimedia signal (e.g., HDMI signal) from a source device 302. The input connector may be an HDMI connector capable of passing an HDMI signal with a resolution up to 4 k at 60 Hz with 24 bits per pixel (bpp) color, as one non-limiting example. In some aspects, the input connector 312A may comprise a female interface compliant with the associated standard (e.g., HDMI standard). In some aspects, the one or more input connectors 312 may comprise a cable retention connector 312B capable of receiving a cable retention feature from an HDMI cable, thereby supporting retention of cables.

In some aspects, the one or more input connectors 312 may include a capture and record connector 312C. A capture and record connector 312C may be configured to receive a capture and record signal from the source device 302, such as an endoscopy camera. The capture and record signal may be transmitted, e.g., when a surgeon presses a capture and record button on the source device 302 (e.g., endoscopic camera), thereby causing (e.g., using a controller 306 of the signal transmitter 304) the sink device 332 to record the multimedia signal. In some aspects, cable 320 may be capable of transmitting both the multimedia signal and the capture and record signal.

Although FIG. 3B illustrates the front side of a signal transmitter wall plate 301 comprising an indicator 310 and a plurality of input connectors 312, aspects of the disclosure may include other components on the signal transmitter wall plate 301 including, but not limited to, a grounding screw (not shown) that creates a low resistance electrical connection for grounding the enclosure of the wall plate. Additionally or alternatively, the signal transmitter wall plate 301 may comprise a power connector (not shown), which may be a terminal block style connector located on the back side of the wall plate. In some aspects, the power connector may couple to a power circuit (not shown) for providing power to the signal transmitter 304 (including components in the signal transmitter 304 such as the logic circuit 308), wherein the power circuit may have a 10-25V range. In some aspects, a power-on signal or a power-off signal may be sent to the power circuit to turn on or turn off, respectively, the logic circuit 308.

Referring back to FIG. 3A, the retimer circuit 314 may be used to retime and/or refresh the input multimedia signal (incoming from the input connector 312). The retimer circuit 314 may communicate with the controller 306, input connector 312, and/or converter 316. For example, one or more multimedia control signals may be communicated between the retimer circuit 314, controller 306, and/or converter 316. In some aspects, the input connector 312 may transmit the input multimedia signal to the retimer circuit 314, and the retime circuit 314 may generate and output a retimed multimedia signal to the converter 316.

The converter 316 may be an electrical-to-optical converter that converts an electrical signal (input multimedia signal to the signal transmitter 304) to another type of signal such as an optical signal (output multimedia signal from the signal transmitter 304). The optical signal may be transmitted over a single fiber or multiple fiber cable. In some aspects, the converter 316 may use one or more methods for converting a plurality of electrical signals into a single optical signal, such as coarse wave division multiplexing. Although not shown in the figure, aspects of the disclosure may comprise a connector configured to couple the converter 316 to a connection 322. For example, a single square connector (SC), lucent connector (LC), straight tip connector (ST), an SFP+ socket, or the like may couple the converter 316 to the connection 322. Converter 316 (and signal transmitter 304) may output any type of signal including, but is not limited to, video, audio, timing or clock data, textual data, controller data, human-machine interface data, etc.

In some aspects, the sink device 332 may receive the multimedia signal from a signal receiver 334. In some aspects, the sink device 332 may be any type of equipment that receives a multimedia signal, such as a multimedia routing system, as one non-limiting example. The signal receiver 334 may receive a multimedia signal from a signal transmitter 304. In some embodiments, the signal receiver 334 includes a signal transceiver operable to transmit a multimedia signal. The signal receiver 334 may be a capable of being attached to a structure or a fixture of a room (e.g., wall 148, ceiling 150, or floor 104 of FIG. 1). For example, the signal receiver 334 may be a wall plate coupled to the sink device 332 via a multimedia cable 324 (e.g., an HDMI cable). In some aspects, the signal receiver 334 may be coupled to the signal transmitter 304 via a connection 322. In some aspects, the connection 322 may comprise, e.g., a fiber optic cable capable of reliably transmitting 4 kp60 video signal over at least 100 meters (without degradation in signal quality). For example, the fiber optic cable may be OM3/OM4 multimode fiber, copper Ethernet, single mode fiber, or any other type of cable for transmitting a multimedia signal.

The signal receiver 334 may comprise a converter 344 and one or more output connectors 340. The converter 344 may be an optical-to-electrical converter that converts an optical signal (multimedia signal transmitted along a connection 322) to an electrical signal (output multimedia signal from the signal receiver 334). In some aspects, the converter 344 (or another component of the signal receiver 334, such as a logic circuit (not shown)) may split a single optical signal into a plurality of electrical signals. In some aspects, the converter 344 or logic circuit may perform one or more signal conversions or translations, including depacketization.

The one or more output connectors 340 may be used to transmit one or more signals to an external component. For example, an output connector 340 may be an HD-format connector (e.g., HDMI connector) configured to transmit an output multimedia signal (e.g., HDMI signal) to the sink device 332. Although not shown in the figure, aspects of the disclosure may comprise a connector configured to couple to the converter 344. Although the figure illustrates the signal receiver 334 as receiving a multimedia signal from a single signal transmitter 304 and a single source device 302, aspects of the disclosure may include the signal receiver 334 receiving signals from a plurality of signal transmitters and/or a plurality of source devices. In some examples, the second signal transceiver 334 may receive a multimedia signal from the sink device 332, and the signal receiver 334 may transmit the multimedia signal to the signal transmitter 304. Further aspects of the disclosure may comprise the signal receiver 334 as including other components not shown in the figure, such as a controller, logic circuit, retimer circuit, indicator, or any combination thereof. In addition, further aspects of the disclosure may comprise a multimedia signal being sent from the signal receiver 334 to the signal transmitter 304 using any of the components and methods described below with respect to FIG. 4.

The signal acquisition process for HD-format signal that has been implemented by conventional multimedia routing systems may not be reliable due to, e.g., failure of the multimedia link from source device to sink device, or transmission of control information from sink device to source device. For example, the multimedia link may not be explicitly defined with the associated format standard. The multimedia link may fail at any moment such as at power up, when coupling a source device, when coupling a sink device, when switching between source devices or sink devices, or any combination thereof.

One way to prevent or reduce failure of the multimedia link comprises a method for establishing a multimedia link, including monitoring the functionality status of one or more of: the signal transmitter 304 when powered on, coupled to a source device 302, or coupled to the signal receiver 334; or the signal receiver 334 when powered on, coupled to a sink device 332, or coupled to the signal transmitter 304. The multimedia link may be established by removing and/or recoupling one or more of: source device 302, signal transmitter 304, signal receiver 334, or sink device 332. Additionally or alternatively, the multimedia link may be established by removing power and then re-applying power to one or more components in the signal transmitter 304 and/or signal receiver 334, resulting in a reset such as a hard boot. In some aspects, power may be removed and then reapplied to the logic circuit 308. The hard boot may prevent or reduce locks or hang ups during power on and/or coupling events.

Figure 4:
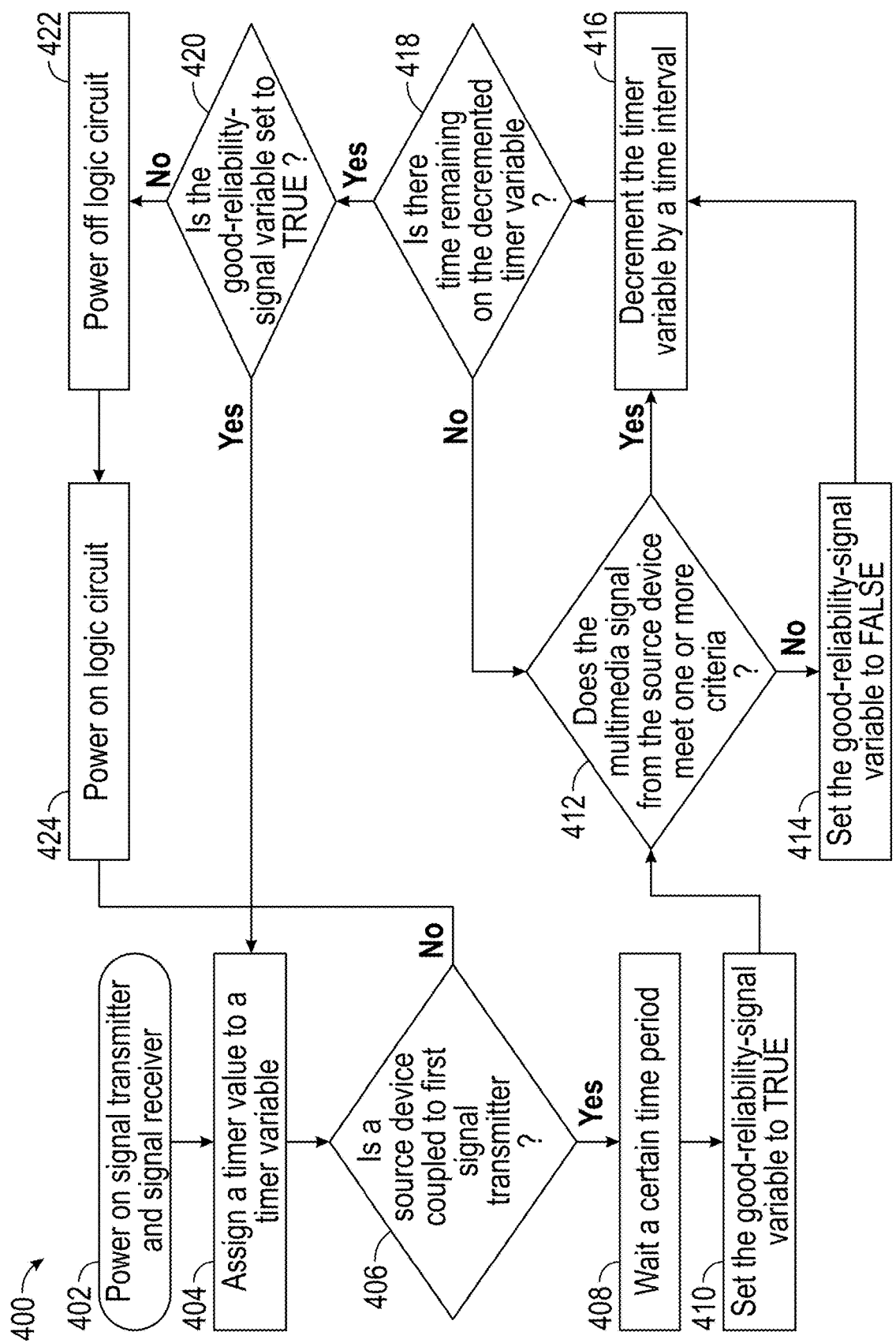
FIG. 4 illustrates a block diagram of an example method for establishing a multimedia link between a source device and a sink device, according to some aspects.

FIG. 4 illustrates a block diagram of an example method for establishing a multimedia link between a source device and a sink device, according to some aspects. The process 400 comprises powering on the signal transmitter 304 and/or signal receiver 334 (of FIG. 3A) at step 402. Power being applied to a signal transmitter or signal receiver may cause its firmware to boot up and configure one or more components. In some aspects, the signal transmitter 304 may attempt to establish a multimedia link with the signal receiver 334. When the multimedia link is established, the signal transmitter 304 may be able to communicate with the signal receiver 334. Once the multimedia link is established, the signal transmitter 304 may enter into a multimedia signal acquisition mode.

At step 404, the controller 306 (of FIG. 3A) of the signal transmitter 304 assigns a timer value to a timer variable. In some aspects, the timer variable may be a predetermined number that the controller uses for a timer countdown (or count up). The timer value may be determined based on testing and analysis, for example, less than 60 seconds (e.g., 4 second, 5 seconds, 6 seconds, etc.). The timer value may be between 10-60 seconds (e.g., 10, 15, 20, 25, 30, 45, or 60 seconds), for example. The controller waits until a countdown (or count up) after the source device 302 (of FIG. 3A) is coupled to the signal transmitter 304 has finished. In some aspects, the source device 302 may be coupled to the signal transmitter 304 when it is coupled to an input connector 312 (of FIG. 3A) of the signal transmitter 304 using a cable 320 (of FIG. 3A).

At step 406, the controller 306 determines whether the source device 302 is coupled to the signal transmitter 304. If a source device 302 is not coupled to the signal transmitter 304, then the controller 306 restarts the timer countdown (or count up).

If a source device 302 is coupled to the signal transmitter 304, then at step 408, the controller 306 waits for a certain time period. At step 410, the controller sets a reliable-multimedia-link-signal variable to a default value (e.g., TRUE). In some aspects, the default value may meet one or more criteria indicating that the multimedia signal is a reliable multimedia link signal (e.g., equal to "TRUE"). During or after the acquisition time period has passed, the controller 306 checks whether the input multimedia signal from the source device meets the one or more criteria in step 412.

In some aspects, one or more other signals or values in the signals may be used to determine whether the multimedia signal meets the one or more criteria and is a reliable multimedia link signal. For example, one or more data values in the multimedia signal or a signal from logic circuit 308 of the signal transmitter 304 to the controller 306 may indicate that the multimedia signal is a reliable multimedia link signal. As another non-limiting example, the controller 306 or logic circuit 308 may verify one or more configuration settings of one or more converters, such as converter 316 of the signal transmitter 304, converter 344 of the signal receiver 344, or both. The one or more criteria may include, without limitation, one or more data values in the multimedia signal or a signal between components of the signal transmitter 304, or one or more configuration settings of a component of the signal transmitter 304 meeting one or more thresholds.

If the multimedia signal does not meet one or more criteria, then at step 414, the reliable-multimedia-link-signal variable may be set to a value that indicates the multimedia signal is a bad signal (e.g., equal to "FALSE"). Otherwise, at step 416, the timer variable is decremented by a time interval. In some aspects, the time interval may be a constant value that is based on the processing time of the controller 306. In some aspects, the time interval may be the smallest value, determined by testing, such that missing momentary losses of the multimedia signal is avoided or reduced.

At step 418, the decremented timer variable is checked to determine if there is time remaining. In some aspects, time is remaining when the decremented time has a value greater than 0 seconds. When the decremented time has a value equal to 0 seconds, then an iteration for process 400 (process for establishing a multimedia link) is complete, and the controller 306 determines whether the multimedia signal is a reliable multimedia link signal (in step 412). If not, then method performs another iteration including resetting the timer variable (e.g., assigned a number, as performed in step 404).

If there is time remaining on the decremented timer variable, as determined in step 418, then the reliable-multimedia-link-signal variable is checked to see whether it is set to TRUE, at step 420. The multimedia signal being a reliable multimedia link signal (as indicted by the reliable-multimedia-link-signal variable being equal to TRUE) indicates that no drops of signal (e.g., video, audio) occurred during a certain continuous time period, then another iteration of monitoring the multimedia link functionality status is performed. In some aspects, a reliable-multimedia-link-signal variable is equal to TRUE when the multimedia signal meets one or more criteria.

At step 422, if the multimedia signal is not a reliable multimedia link signal (as indicated by the reliable-multimedia-link-signal variable not being TRUE and/or not meeting one or more criteria), then the logic circuit 308 is turned off. In some aspects, turning off the logic circuit 308 comprises the controller 306 sending a power-off signal to the logic circuit 308. In some aspects, turning off the logic circuit 308 comprises the controller 306 sending a power-off signal to a power circuit that powers the logic circuit 308. In some aspects, the logic circuit 308 may be turned off for a certain off-time period (logic circuit off time), wherein the logic circuit 308 is powered down, and the off-time period is based on the time required to clear the configuration settings of the logic circuit 308. Clearing the logic circuit 308 configuration settings may cause it to reboot. The logic circuit off time may be a predetermined value, determined during testing. For example, the logic circuit 308 may comprise an FPGA. The FPGA may be turned off for a certain off-time period, powering down the FPGA. The off-time period may be such that the configuration settings of the FPGA may be cleared when the FGPA is off for the off-time period. As another example, the logic circuit 308 may comprise an ASIC, wherein the ASIC is powered down and off for an off-time period.

At step 424, the logic circuit 308 (e.g., FPGA, ASIC, microprocessor, microcontroller, PLD, etc.) is turned back on. In some aspects, turning on the logic circuit 308 comprises the controller 306 sending a power-on signal to the logic circuit 308. In some aspects, turning on the logic circuit 308 comprises the controller 306 sending a power-on signal to a power circuit that powers the logic circuit 308. In some aspects, turning on the logic circuit 308 may cause it to be reconfigured, which may result in one or more indicators (e.g., a hot plug signal or ready signal) being asserted or reasserted. In some aspects, a hot plug signal being asserted or reasserted indicates that the signal transmitter 304 is ready to receive the input multimedia signal. In some aspects, a ready indicator may be a signal from the source device to the signal transmitter 304. The ready indicator may indicate whether or not the coupled source device is ready for transmitting the multimedia signal. In some aspects, reasserting the hot plug signal or ready signal may cause the source device to disable and re-enable the output multimedia signal, which can improve reliability of the multimedia signal. After the logic circuit 308 is powered on at step 424, the next iteration proceeds with step 404.

Although FIG. 4 illustrates a method that continues endlessly, aspects of the disclosure comprise ending the method after a predetermined number of failed attempts (failed consecutive iterations) or a failed time duration—where the input multimedia signal does not meet the one or more criteria—has been reached (greater than a predetermined number). The steps of method 400 are repeated, including the waiting and/or determining steps 408-412, for a number of failed consecutive iterations or failed time duration. A failed iteration occurs when the multimedia signal does not meet one or more criteria (indicative of a reliable multimedia link signal). The method ends when the number of failed consecutive iterations of the failed time duration is greater than a predetermined number. The predetermined number may be, 3 times, 4 times, 5 times, 6 times, 10 times, etc.; any number of times. Additionally or alternatively, the method may end when the source device 302 is decoupled from the signal transmitter 304.

In some instances, the signal acquisition process for HD-format signal implemented by conventional signal routing systems may not be reliable when the type of multimedia signal output from the source device does not align with one or more configuration settings. For example, the source device may be transmitting HD-format signal, but the image and video capture device 108 or sink device may be configured for a first format (e.g., UHD format). The image and video capture device 108 or sink device may lock up or be stuck in a hung state. In some aspects, control information may be transmitted to help reduce or avoid these lock or hang ups. In some aspects, the properties of the multimedia link (e.g., signal acquisition, reliable establishment, sustainment) can vary for different types of devices (e.g., source devices, sink devices), such as between different manufacturers. These variations may lead to transmission errors and/or differences in the algorithms implemented by the devices. In some aspects, the signal acquisition process may fail due to failed transmission of control information from source device to sink device, transmission of incorrect control information, the sink device failing to properly process the control information it has received, and/or timing mismatches between source device and sink device that may result in synchronization issues.

Figure 5:
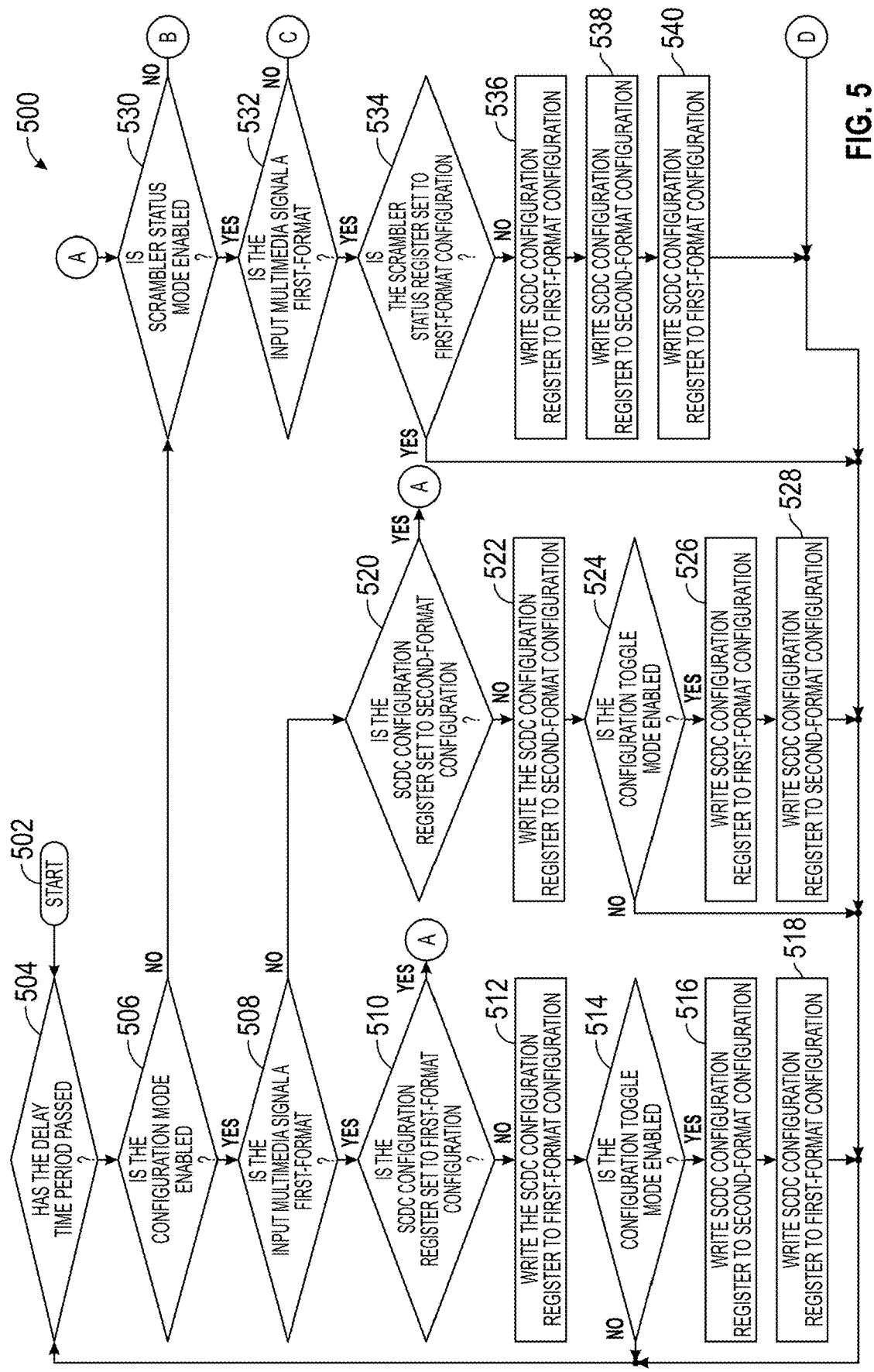
FIG. 5 illustrates a block diagram of an example method for establishing a multimedia link based on one or more registers, according to some aspects.
Figure 5:
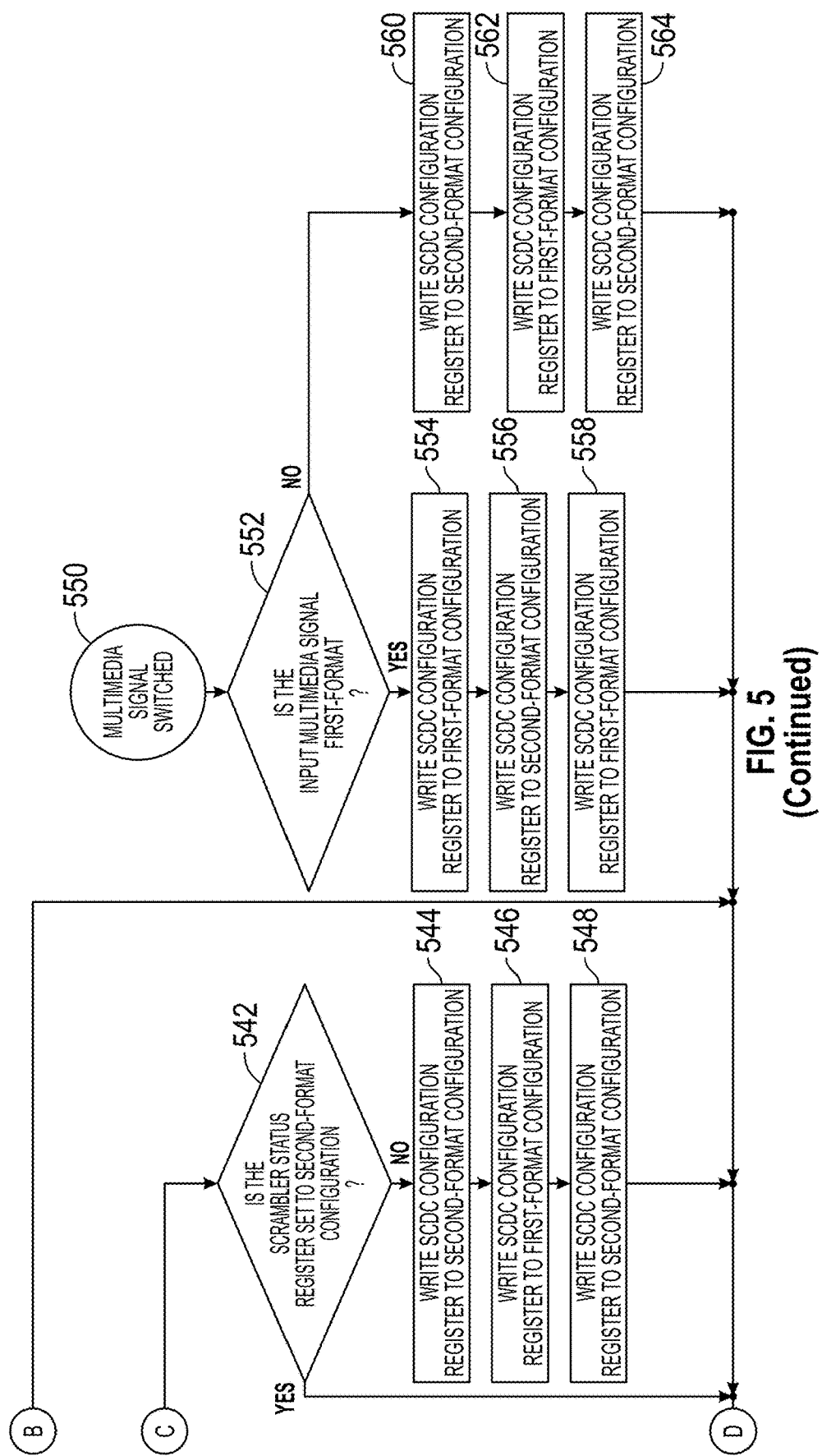

Aspects of the disclosure include establishing a multimedia link using one or more registers for control information. FIG. 5 illustrates a block diagram of an example method for establishing a multimedia link based on one or more registers, according to some aspects. The process 500 begins at step 502. In some aspects, process 500 may comprise a transition minimized differential signaling (TMDS) configuration algorithm, a scrambler status algorithm, or a multimedia signal format switching algorithm performed using an image and video capture device 108 (shown in FIG. 1). At step 504, the system waits until a pre-determined delay time period has passed. In some aspects, the pre-determined delay time period may be 10 seconds. In some aspects, the system may have multiple operation modes related to the register(s) for control information.

One operation mode may be a configuration mode. A configuration mode register may have a value written by the source device 302 indicating whether the configuration mode is enabled or disabled. In some aspects, the configuration mode may be a transition minimized differential signaling (TMDS) configuration mode. At step 506, a controller 306 checks whether the configuration mode is enabled or disabled. In some aspects, when the configuration mode variable is equal to 0, the configuration mode is disabled and the steps in the configuration mode algorithm are not executed. If the configuration mode variable is equal to 1 or 2 (or alternatively, if the configuration mode variable is not equal to 0), the TMDS configuration mode is enabled. The method 500 may proceed to step 508, where the controller 306 determines whether the input multimedia signal is a first format (e.g., UHD format comprising 4K resolution), or alternatively determines whether or not the input signal is a second format, such as HD format.

If the input multimedia signal is a first format, the controller then determines if the configuration setting in a status and control data channel (SCDC) configuration register (e.g., within a sink device 332) is set according to the type of input multimedia signal. If the input multimedia signal is a first format, then at step 510, the SCDC configuration register is read to determine whether or not it is set to a first-format configuration. If not, then the controller can write the SCDC configuration register to a first-format configuration at step 512.

In some aspects, toggling the configuration settings in the SCDC configuration register may remove a lockup. At step 514, the configuration mode register can be checked to determine whether the configuration toggle mode is enabled. If enabled, then the controller 306 writes to the SCDC configuration register to toggle between second-format configuration, e.g., for HD format (write SCDC configuration register to second-format configuration in step 516), and first-format configuration, e.g., for UHD format comprising 4K resolution (write SCDC configuration register to first-format configuration in step 518). In some aspects, the toggling may cause a momentary interruption of an established multimedia link but can break or prevent the sink device from being stuck in a hung state. The prevention or reduction of lock or hang ups may improve the reliability of routing multimedia signals across the multimedia link.

In some aspects, TMDS configuration rewrite mode is enabled, then the SCDC configuration register is written once to a second-format configuration or first-format configuration depending on the desired resolution. For example, step 512 may be executed without step 516 or step 518 being executed. The TMDS configuration rewrite mode may prevent or reduce momentary drops of signal (e.g., video, audio).

If, at step 508, it is determined that the input multimedia signal is not a first format, then at step 520, the SCDC configuration register can be read to determine whether or not it is set to a second-format configuration. If not, then the system can write the SCDC configuration register to second-format configuration at step 522.

At step 524, the configuration mode register can be checked to determine whether the configuration toggle mode is enabled. If enabled, then the system writes to SCDC configuration register to toggle between first-format configuration, e.g., UHD format comprising 4K resolution (write SCDC configuration to first-format configuration in step 526) and second-format configuration, e.g., HD format (write SCDC configuration to second-format configuration in step 528).

If the TMDS configuration mode is not enabled (determined at step 506), then at step 530, the system determines whether another operation mode, called scrambler status mode, is enabled. In some aspects, a scrambler status mode variable is reset by a sink device. For example, if a certain voltage is not present and/or a pulse is detected on a hot plug signal, then the sink device may reset the scrambler status mode variable. The source device may check the scrambler status mode variable. If the scrambler status mode variable is equal to 0, the scrambler status mode is disabled, and the steps in the scrambler status mode algorithm are not executed. If scrambler status mode is enabled (determined by the scrambler status mode variable being equal to 1 (or alternatively, if the scrambler status mode variable is not equal to 0)), then at step 532, the system checks whether the input multimedia signal is a first format (e.g., UHD format comprising 4K resolution), or alternatively determines whether or not the input multimedia signal is HD format.

In some aspects, a scrambler status register may be used to store a scramble status variable, which indicates whether or not the sink device is detecting scrambled data. For example, if the sink device detects scrambled data, it can set the scramble status variable to, e.g., 1. The source device can read the scrambler status register to determine whether or not the sink device is properly decoding the multimedia signal that it is receiving. In some aspects, the scramble status variable may be communicated between the source device and sink device using, e.g., a status message.

If the scramble status variable has not been set or has a value equal to 0, then the system checks whether the input multimedia signal is a first or second format (e.g., UHD or HD format). If the source device signal is a first format, then at step 534, a scrambler status register is read to determine whether or not it is set to first-format configuration. In some aspects, the scrambler status register may be a register in the sink device. If the value of the scrambler status register does not match the expected value, then the system may perform multiple writes to the SCDC configuration register of the sink device to toggle between a second-format configuration and a first-format configuration. For example, the SCDC configuration register may be toggled to first-format configuration at step 536, second-format configuration at step 538, and first-format configuration at 540.

If the input multimedia signal is not a first format (determined at step 532), the scrambler status register can be checked in step 542 to determine whether it is set to second-format configuration. If not, then at step 544, the SCDC configuration register is set to second-format configuration, and then toggled to first-format configuration (at step 546) followed by second-format configuration (at step 548).

In some aspects, the input multimedia signal may switch from a second format to a first format (e.g., HD format to UHD format), or vice versa (UHD format to HD format) (step 550). The configuration register may be toggled to cause it to no longer be stuck, removing a lockup. If the input multimedia signal switched from the second format to the first format, then it is determined at step 552 that the input multimedia signal is a first format, and the SCDC configuration register is toggled by writing a first-format configuration at step 554, a second-format configuration at step 556, and a first-format configuration at step 558. If the input multimedia signal changed from a first format to a second format, then it is determined at step 552 that the input multimedia signal is HD, and the SCDC configuration register is toggled by writing a second-format configuration at step 560, a first-format configuration at step 562, and an second-format configuration at step 564.

Figure 6:
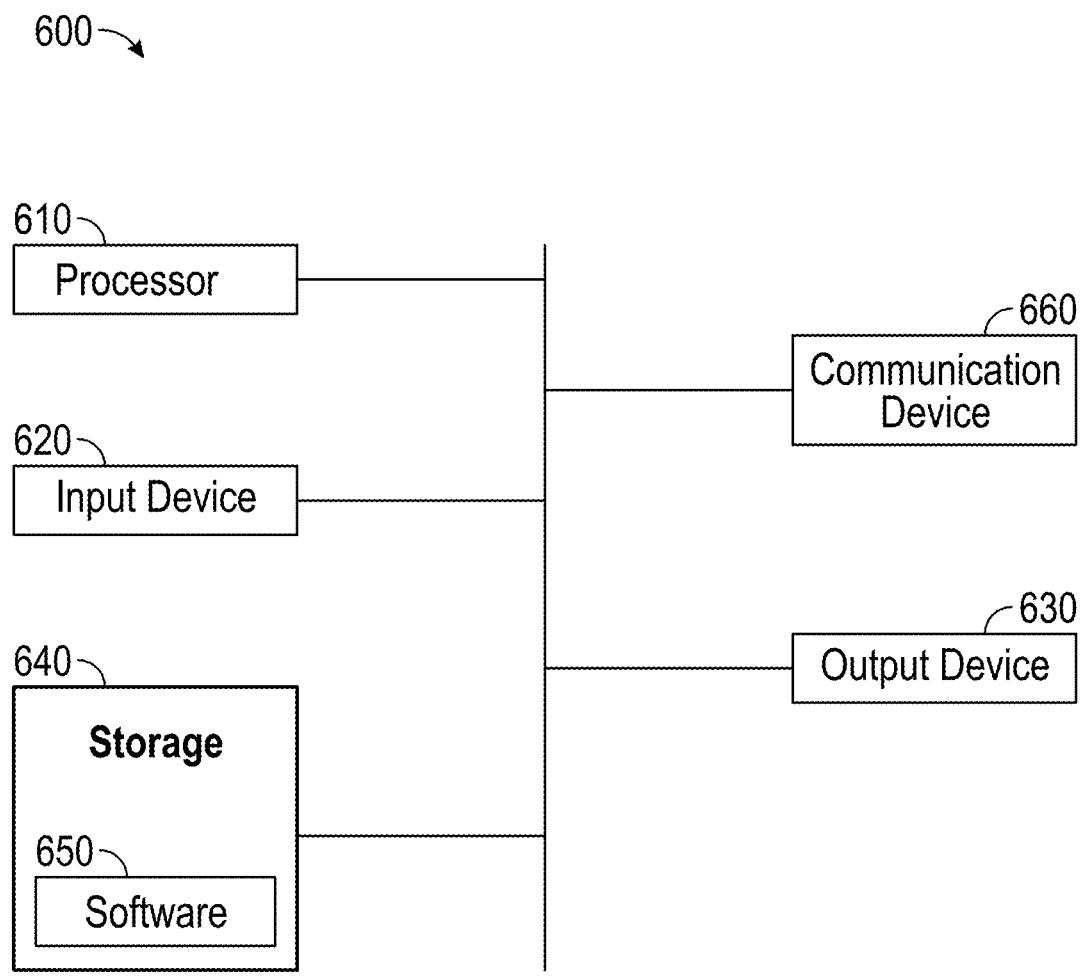
FIG. 6 illustrates an example computing system used for performing any of the methods and systems described herein, according to some aspects.

FIG. 6 illustrates an example computing system, in accordance with some examples, that can be used for performing any of the methods described herein, including method 400 of FIG. 4 and method 500 of FIG. 5, and can be used for any of the systems described herein, including the image and video capture device 108 and multimedia routing system 300 of FIGS. 2 and 3, respectively. System 600 can be a computer coupled to a network, which can be, for example, an operating room network or a hospital network. System 600 can be a client computer or a server. As shown in FIG. 6, system 600 can be any suitable type of controller (including a microcontroller) or processor (including a microprocessor) based system, such as an embedded control system, personal computer, workstation, server, or handheld computing device (portable electronic device) such as a phone or tablet. The system can include, for example, one or more of processor 610, input device 620, output device 630, storage 640, or communication device 660.

Input device 620 can be any suitable device that provides input, such as a touch screen, keyboard or keypad, mouse, gesture recognition component of a virtual/augmented reality system, or voice-recognition device. Output device 630 can be or include any suitable device that provides output, such as a touch screen, haptics device, virtual/augmented reality display, or speaker.

Storage 640 can be any suitable device that provides storage, such as an electrical, magnetic, or optical memory including a RAM, cache, hard drive, removable storage disk, or other non-transitory computer readable medium. Communication device 660 can include any suitable device capable of transmitting and receiving signals over a network, such as a network interface chip or device. The components of the computer can be coupled in any suitable manner, such as via a physical bus or wirelessly.

Software 650, which can be stored in storage 640 and executed by processor 610, can include, for example, the programming that embodies the functionality of the present disclosure (e.g., as embodied in the devices as described above). For example, software 650 can include one or more programs for performing one or more of the steps of the methods disclosed herein.

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic, or infrared wired or wireless propagation medium.

System 600 may be coupled to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 600 can implement any operating system suitable for operating on the network. Software 650 can be written in any suitable programming language, such as C, C++, C#, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific aspects. However, the illustrative discussions above are not intended to be exhaustive or to limit the invention to the precise forms disclosed. Many modifications and variations are possible in view of the above teachings. The aspects were chosen and described in order to best explain the principles of the techniques and their practical applications. Others skilled in the art are thereby enabled to best utilize the techniques and various aspects with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method of establishing a multimedia link between a source device and a sink device, the method comprising:
   receiving, by a signal transceiver, an input multimedia signal from the source device, wherein the signal transceiver comprises a logic circuit and a controller;
   determining, by the signal transceiver, whether the input multimedia signal meets one or more criteria during or after an acquisition time period; and
   in accordance with the input multimedia signal not meeting the one or more criteria:
      turning off, by the signal transceiver, the logic circuit of the signal transceiver for an off-time period;
      determining, by the signal transceiver, a time remaining in the off-time period; and
      turning on, by the signal transceiver, the logic circuit after the off-time period.

2. The method of claim 1, wherein the off-time period is the time required to clear configuration settings of the logic circuit.

3. The method of claim 1, wherein the one or more criteria comprise at least one of:
   one or more data values in the input multimedia signal or a signal from the logic circuit to the controller of the signal transceiver meeting one or more thresholds; and
   one or more configuration settings of one or more converters of the signal transceiver or a signal receiver meeting one or more thresholds.

4. The method of claim 1, wherein the turning off the logic circuit and the turning on the logic circuit cause at least one of:
   a hot plug signal to be reasserted, wherein the hot plug signal being asserted or reasserted indicates that the signal transceiver is ready to receive the input multimedia signal; and
   the source device to disable and re-enable the input multimedia signal.

5. The method of claim 1, wherein the turning off the logic circuit comprises sending a power-off signal from the controller to at least one of:
   the logic circuit, wherein the turning on the logic circuit comprises sending a power-on signal from the controller to the logic circuit; and
   a power circuit that powers the logic circuit, wherein the turning on the logic circuit comprises sending a power-on signal from the controller to the power circuit.

6. The method of claim 1, further comprising:
   converting, using an optical-to-electrical converter of a signal receiver, an optical signal to an electrical signal; and
   outputting, using the signal receiver, the electrical signal as an output multimedia signal to the sink device.

7. The method of claim 1, further comprising:
   causing, using the controller, the sink device to record the input multimedia signal when a capture and record signal is transmitted.

8. The method of claim 1, wherein the acquisition time period is less than 60 seconds.

9. The method of claim 1, further comprising:
   performing, using an image and video capture device, one or more of: a transition minimized differential signaling (TMDS) configuration algorithm, a scrambler status algorithm, or a multimedia signal format switching algorithm.

10. A system comprising:
    a signal transceiver comprising:
       one or more input connectors, wherein at least one input connector is configured to receive an input multimedia signal from a source device;
       a logic circuit; and
       a controller configured to:
          determine whether the input multimedia signal meets one or more criteria during or after an acquisition time period; and
          in accordance with the input multimedia signal not meeting the one or more criteria:
             turn off the logic circuit for an off-time period;
             determine a time remaining in the off-time period; and
             turn on the logic circuit after the off-time period.

11. The system of claim 10, wherein the off-time period is the time required to clear configuration settings of the logic circuit.

12. The system of claim 10, wherein the one or more criteria comprise at least one of:
one or more data values in the input multimedia signal or a signal from the logic circuit to the controller meeting one or more thresholds; and
one or more configuration settings of one or more converters of the signal transceiver or a signal receiver meeting one or more thresholds.

13. The system of claim 10, wherein the logic circuit causes at least one of:
a hot plug signal to be reasserted, wherein the hot plug signal being asserted or reasserted indicates that the signal transceiver is ready to receive the input multimedia signal; and
the source device to disable and re-enable the input multimedia signal.

14. The system of claim 10, wherein the controller sends a power-off signal to at least one of:
the logic circuit to turn off the logic circuit, wherein the controller sends a power-on signal to the logic circuit to turn on the logic circuit; and
a power circuit that powers the logic circuit to turn off the logic circuit, wherein the controller sends a power-on signal to the power circuit to turn on the logic circuit.

15. The system of claim 10, further comprising:
a power circuit for powering the signal transceiver, wherein the power circuit has a 10-25V range.

16. The system of claim 10, wherein the signal transceiver further comprises a retimer circuit that retimes the input multimedia signal, refreshes the input multimedia signal, or both.

17. The system of claim 10, further comprising:
a signal receiver comprising:
an optical-to-electrical converter that converts an optical signal to an output multimedia signal; and
one or more output connectors, wherein at least one output connector is configured to output the output multimedia signal to a sink device.

18. The system of claim 10, wherein the acquisition time period is less than 60 seconds.

19. The system of claim 10, further comprising:
an image and video capture device that performs one or more of: a transition minimized differential signaling (TMDS) configuration algorithm, a scrambler status algorithm, or a multimedia signal format switching algorithm.

20. A non-transitory computer-readable storage medium storing computer program product including non-transitory computer-implementable instructions configured to be executed by one or more processors of a system, wherein executing the instructions causes the system to:
receive, by a signal transceiver, an input multimedia signal from a source device, wherein the signal transceiver comprises a logic circuit and a controller;
determine, by the signal transceiver, whether the input multimedia signal meets one or more criteria during or after an acquisition time period; and
in accordance with the input multimedia signal not meeting the one or more criteria:
turn off, by the signal transceiver, the logic circuit of the signal transceiver for an off-time period;
determine, by the signal transceiver, a time remaining in the off-time period; and
turn on, by the signal transceiver, the logic circuit after the off-time period.

21. The method of claim 1, wherein the in accordance with the input multimedia signal not meeting the one or more criteria further comprises:
after waiting for a time period, determining, by the signal transceiver, that the input multimedia signal does not meet the one or more criteria,
wherein the turning off the logic circuit is performed when the input multimedia signal does not meet the one or more criteria after waiting for the time period.

* * * * *